US008885667B2

(12) United States Patent
da Silva et al.

(10) Patent No.: US 8,885,667 B2
(45) Date of Patent: Nov. 11, 2014

(54) DESTINATION BASED METHODOLOGY FOR MANAGING NETWORK RESOURCES

(75) Inventors: Ron da Silva, Ashburn, VA (US); Shan Huang, Ashburn, VA (US); Michael S. Kelsen, Centreville, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 760 days.

(21) Appl. No.: 12/500,751

(22) Filed: Jul. 10, 2009

(65) Prior Publication Data

US 2011/0007752 A1     Jan. 13, 2011

(51) Int. Cl.
| | |
|---|---|
| *H04L 12/801* | (2013.01) |
| *H04L 12/823* | (2013.01) |
| *H04L 12/851* | (2013.01) |
| *H04L 12/413* | (2006.01) |
| *H04L 12/927* | (2013.01) |
| *H04L 12/813* | (2013.01) |

(52) U.S. Cl.
CPC ............... *H04L 47/10* (2013.01); *H04L 47/32* (2013.01); *H04L 47/2441* (2013.01); *H04L 12/413* (2013.01); *H04L 47/808* (2013.01); *H04L 47/12* (2013.01); *H04L 47/20* (2013.01)
USPC ........................................ 370/468

(58) Field of Classification Search
CPC ....... H04L 47/10; H04L 47/12; H04L 47/808; H04L 47/2441; H04L 47/32; H04L 47/20; H04L 12/413
USPC ......................... 370/229–231, 468
See application file for complete search history.

(56) References Cited

U.S. PATENT DOCUMENTS

| | | | |
|---|---|---|---|
| 2002/0057651 A1* | 5/2002 | Roberts ......................... | 370/235 |
| 2003/0048750 A1* | 3/2003 | Kobayashi .................... | 370/229 |
| 2005/0015810 A1 | 1/2005 | Gould | |
| 2005/0038880 A1 | 2/2005 | Danforth | |

(Continued)

OTHER PUBLICATIONS

Neowin.Net "Virgin Media Officially "Throttling" Users" May 3, 2007.*

(Continued)

*Primary Examiner* — Jason Mattis
*Assistant Examiner* — Stephen J Clawson
(74) *Attorney, Agent, or Firm* — Otterstedt, Ellenbogen & Kammer, LLP (57) ABSTRACT

A replicator is configured to be coupled to a first packet-based network, and a packet analysis module and a router are coupled to the replicator. The router is configured to be coupled to a second packet-based network. The replicator receives packets from the first packet-based network, passes the packets to the router, and passes a copy of the packets to the packet analysis module. The packet analysis module identifies, in a set of customers of the second packet-based network, a top usage subset. The top usage subset includes those of the customers who are using more bandwidth of the second packet-based network than other ones of the customers. The top usage subset includes at least two of the customers. The packet analysis module identifies, at an entry point of the second packet-based network, routes of packets destined for the top usage subset. The router discards a predetermined percentage of the packets destined for the top usage subset. The predetermined percentage is determined in order to reduce bandwidth utilization of the second packet-based network by a desired amount. The predetermined percentage is identical for all of the customers in the top usage subset.

21 Claims, 7 Drawing Sheets

(56) References Cited

U.S. PATENT DOCUMENTS

| | | | |
|---|---|---|---|
| 2005/0052992 A1* | 3/2005 | Cloonan et al. | 370/229 |
| 2007/0274274 A1* | 11/2007 | Carothers | 370/338 |
| 2007/0280125 A1 | 12/2007 | Sonnier | |
| 2009/0319596 A1 | 12/2009 | Kumar | |

OTHER PUBLICATIONS

White, Russ, et. al. "Practical BGP" Addison-Wesley Professional. Jul. 5, 2004.*

Sandvine Fairshare Traffic Management, 2010, Sandvine Incorporated ULC, Downloaded From http://www.sandvine.com/downloads/documents/Sandvine%20Fairshare%20Traffic%20Management.

Sandvine Unveils Fairshare™ Product to Enhance Traffic Optimization, 2008, Sandvine Incorporated ULC, Downloaded From http://sandvine.com/news/pr_detail.asp?ID=169.

Declaration of Michael S. Kelsen, Aug. 22, 2011.

* cited by examiner

DESTINATION BASED METHODOLOGY FOR MANAGING NETWORK RESOURCES

FIELD OF THE INVENTION

The present invention relates generally to communications systems and methods, and, more particularly, to broadband Internet access provided in association with video content networks and the like.

BACKGROUND OF THE INVENTION

Until recently, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber networks (HFNs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like.

One significant issue for a cable operator desiring to provide digital service is the configuration of its network. Designed for one-way delivery of broadcast signals, the existing cable network topology was optimized for downstream (toward the subscriber) only service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and will be referred to for the remainder of this application in capital letters, without the ® symbol, for convenience.

Currently, subscribers may be charged a monthly fee for Internet access, regardless of the amount of bandwidth they consume. Some customers may use an inordinate amount of bandwidth, which is unfair to those who use a reasonable amount.

SUMMARY OF THE INVENTION

Principles of the present invention provide a destination based methodology for managing network resources. In one aspect, an exemplary method (which can be computer-implemented) includes the step of identifying, in a set of customers of a packet communications network, a top usage subset. The top usage subset includes those of the customers who are using more bandwidth of the packet communications network than other ones of the customers. The top usage subset includes at least two of the customers. The method also includes identifying, at an entry point of the communications network, routes of packets destined for the top usage subset; and discarding a predetermined percentage of the packets destined for the top usage subset, based on the routes identified in the route-identifying step. The predetermined percentage is determined in order to reduce bandwidth utilization of the packet communications network by a desired amount. The predetermined percentage is identical for all of the customers in the top usage subset.

In another aspect, an exemplary system for policing traffic from a first packet-based network to a second packet-based network includes a replicator configured to be coupled to the first packet-based network; a packet analysis module coupled to the replicator; and a router coupled to the replicator and the packet analysis module. The router is configured to be coupled to the second packet-based network. The replicator receives packets from the first packet-based network, passes the packets to the router, and passes a copy of the packets to the packet analysis module. The packet analysis module identifies, in a set of customers of the second packet-based network, a top usage subset. The top usage subset includes those of the customers who are using more bandwidth of the second packet-based network than other ones of the customers. The top usage subset includes at least two of the customers. The packet analysis module identifies, at an entry point of the second packet-based network, routes of packets destined for the top usage subset. The router discards a predetermined percentage of the packets destined for the top usage subset. The predetermined percentage is determined in order to reduce bandwidth utilization of the second packet-based network by a desired amount. The predetermined percentage is identical for all of the customers in the top usage subset.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

Techniques of the present invention can provide substantial beneficial technical effects. For example, one or more embodiments may have the advantage of enhancing fairness of traffic utilization in networks where some consumers of network resources disproportionately consume those resources to the detriment of other consumers.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
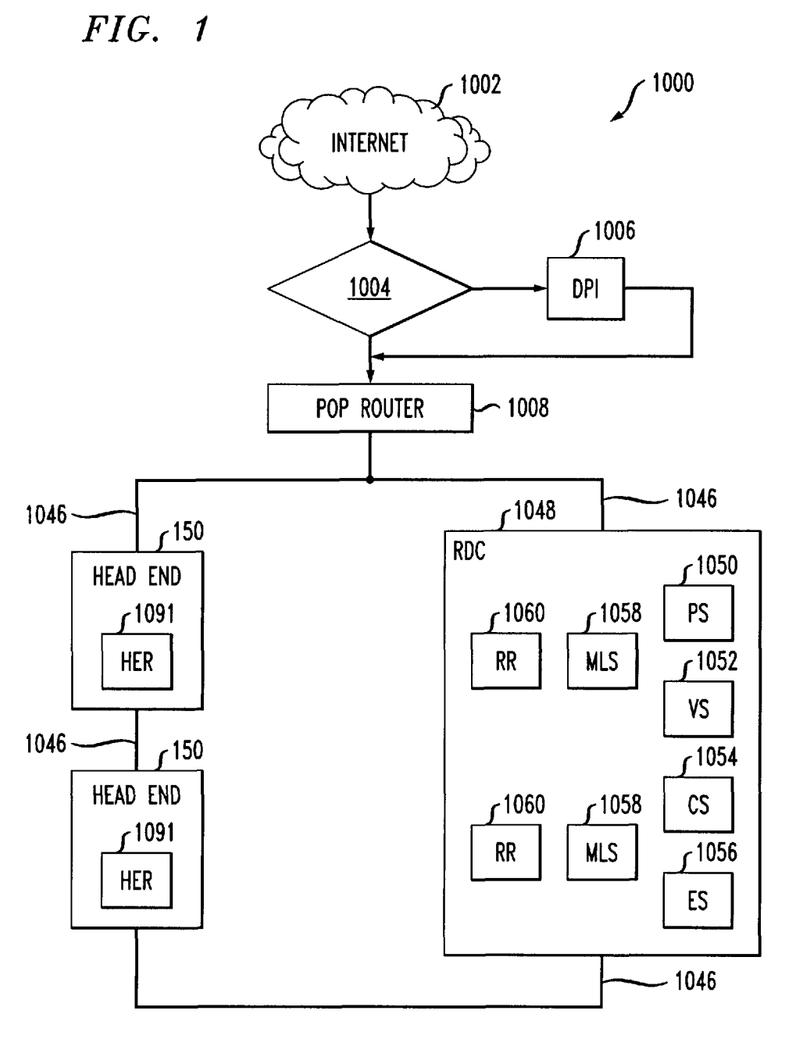
FIG. 1 is a block diagram of an exemplary embodiment of a system, according to an aspect of the invention.

FIG. 1 shows an exemplary system 1000, according to an aspect of the invention. System 1000 includes a regional data center (RDC) 1048, and one or more divisions, represented by division head ends 150. RDC 1048 and head ends 150 are interconnected by a network 1046; by way of example and not limitation, a dense wavelength division multiplex (DWDM) network. Elements 1048, 150 on network 1046 may be operated, for example, by or on behalf of a cable multi-service operator (MSO), and may be interconnected with a global system of interconnected computer networks that use the standardized Internet Protocol Suite (TCP/IP)(transfer control protocol/Internet protocol), commonly called the Internet 1002. In one or more embodiments, such interconnection is made via passive tap 1004, router 1008, and deep packet inspection (DPI) module 1006. In one or more embodiments, router 1008 is a point-of-presence ("POP") router; for example, of the kind available from Juniper Networks, Inc., Sunnyvale, Calif., USA. Furthermore, in one or more embodiments, DPI module 1006 is of the kind available from Sandvine Incorporated of Waterloo, Ontario, Canada, and may implement the FairShare™ traffic optimization solution (mark of Sandvine Incorporated).

Head ends 150 may each include a head end router (HER) 1091 which interfaces with network 1046. Head end routers 1091 are omitted from FIGS. 2-4 below to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

Figure 2:
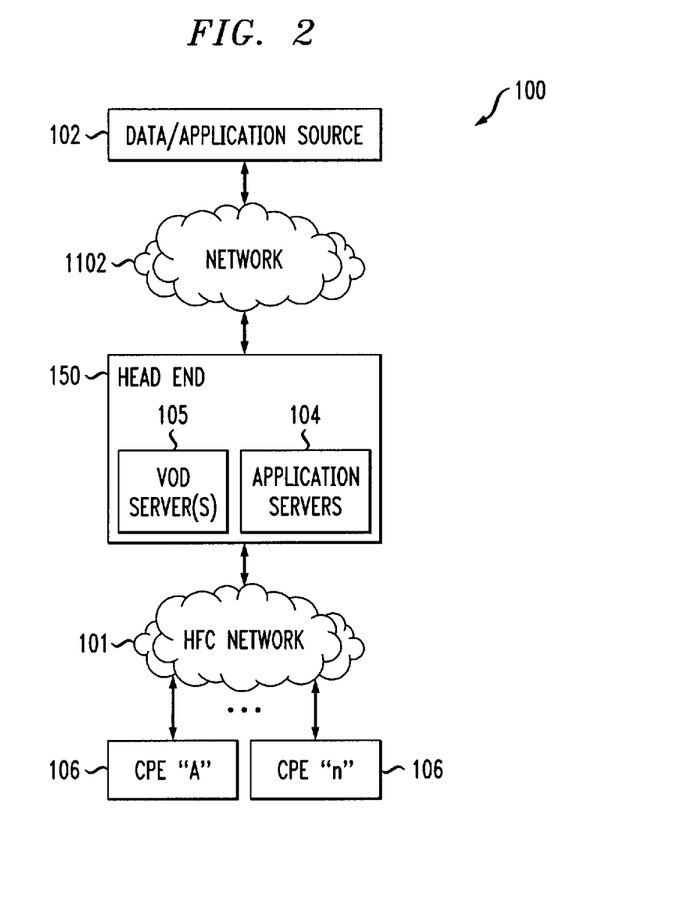
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE) 106. The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within RDC 1048 or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by a distribution server 104 or a cable modem termination system 156 (discussed below with regard to FIG. 3). Non-limiting examples of CPE are set-top boxes and high-speed cable modems for providing high bandwidth Internet access in premises such as homes and businesses.

Figure 3:
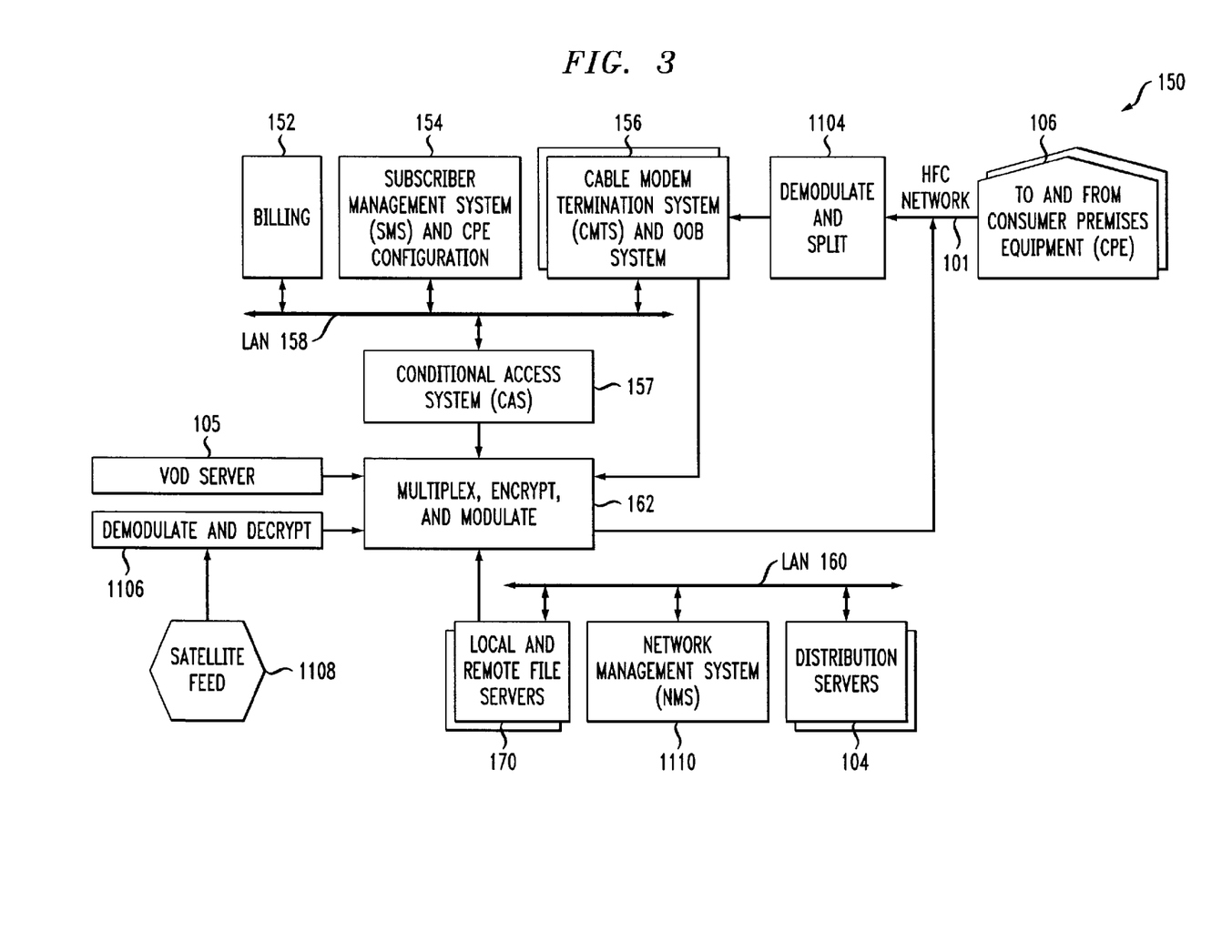
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 154, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as, for example, where the VOD servers are associated with a core switching device such as an 802.3z Gigabit Ethernet device). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components. Content (e.g., audio, video, etc.) is provided in each downstream (in-band) channel associated with the relevant service group. To communicate with the head-end or intermediary node (e.g., hub server), the CPE 106 may use the out-of-band (OOB) or aforementioned DOCSIS channels and associated protocols. The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1104 are fed to CMTS and OOB system 156.

Figure 4:
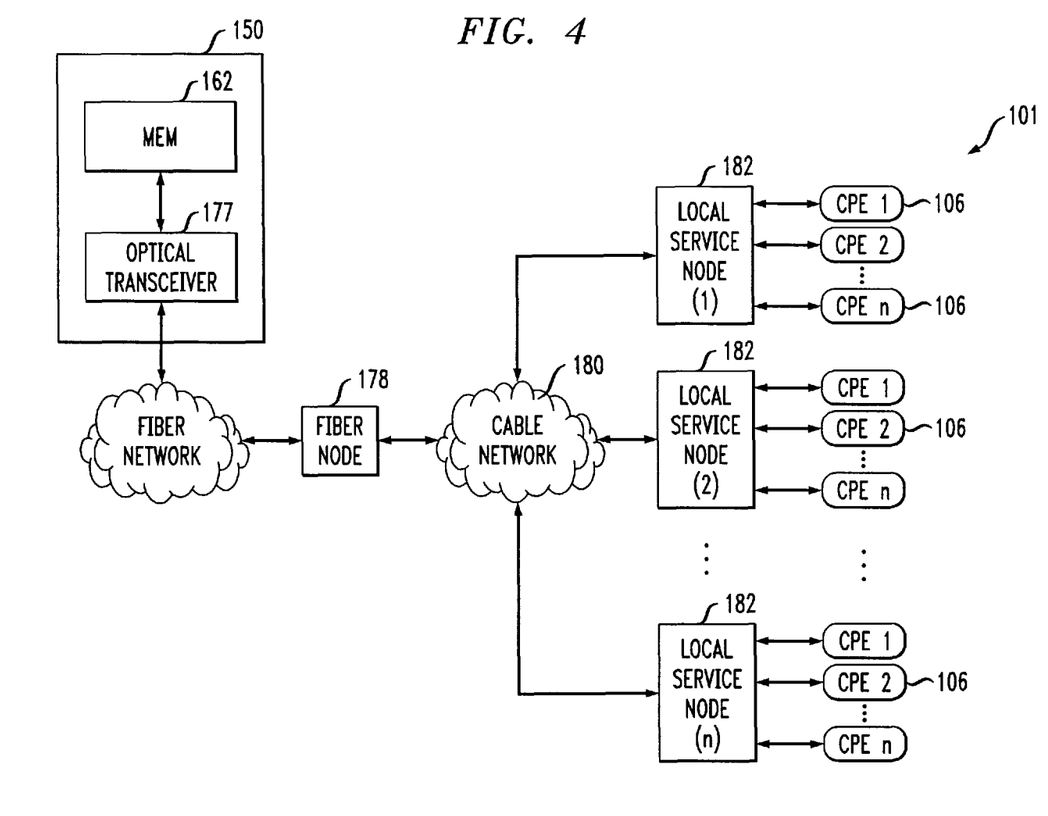
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM).

In another aspect, the network 101 may be a switched digital network, as known, for example, from US Patent Publication 2003/0056217 of Paul D. Brooks, entitled "Technique for Effectively Providing Program Material in a Cable Television System," the complete disclosure of which is expressly incorporated herein by reference in its entirety for all purposes. The Brooks publication describes one exemplary broadcast switched digital architecture useful with one or more embodiments of the present invention, although it will be recognized by those of ordinary skill that other approaches and architectures may be substituted.

In addition to "broadcast" content (e.g., video programming), the systems of FIGS. 1-4 also deliver Internet data services using the Internet protocol (IP), although other protocols and transport mechanisms of the type well known in the digital communication art may be substituted. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

As noted above, currently, subscribers may be charged a monthly fee for Internet access, regardless of the amount of bandwidth they consume. Some customers may use an inordinate amount of bandwidth, which is unfair to those who use a reasonable amount. Thus, one or more embodiments of the invention provide techniques to police downstream traffic from those customers using the most bandwidth on the network, such customers being referred to herein as "top users." In one or more embodiments, the top users are identified and an aggregate bandwidth (BW) limit is applied to the top users as a group to reduce their traffic by a predetermined amount (by way of example and not limitation, say, five or ten percent). Preferably, this traffic policing is carried out with low deployment costs as well as a low rate of customer calls and/or complaints.

It has been found that in some cases, the 5% of top users may consume as much as 90% of the available bandwidth. These figures are exemplary and non-limiting.

Note that one or more embodiments of the invention address all kinds of traffic and police based on destination. That is, one or more embodiments of the invention do not target a specific type of traffic; rather, a particular customer or set of customers who are consuming the most BW on the network at any point in time are targeted. Referring back to FIG. 1, in one or more embodiments, the links from the Internet 1002 have passive taps 1004 put on them. Passive tap 1004 sends a copy of the data in a different direction without impacting the data. In this case, the copy is sent to DPI module 1006. Router 1008 usually only looks at the header (source, destination, port number, and so on). DPI module 1006 is typically capable of looking all the way into the payload of the packet and of obtaining information from the payload. However, in one or more embodiments of the invention, examination of the payloads is not required and the DPI module 1006 merely needs to analyze the header information to calculate the bandwidth utilization. Many vendors provide DPI boxes. Large volumes of traffic must typically be analyzed; for example, multiple 10 gigabit interfaces and millions of IP addresses from a region, thus, a purpose-built piece of hardware is typically required, as a general purpose computer typically lacks sufficient processing power. As used herein, a "deep packet inspection box" or "DPI box" refers to a purpose-built piece of hardware for deep packet inspection. Furthermore, as used herein, a "deep packet inspection module" or "DPI module" refers to a DPI box or other piece of hardware (and any needed software of firmware) with sufficient processing power to perform the analysis of header information as described herein. Techniques which may be implemented in DPI module 1006 are depicted in flow chart 506 of FIG. 6. DPI module 1006 examines consumption by each individual cable MSO customer that is downstream on the network (for example, on network 1046). The DPI module 1006 ranks the customers from the customer who is consuming the most to the customer who is consuming the least, as shown at block 520, thus facilitating compiling the list of top users, as described in greater detail below.

Figure 6:
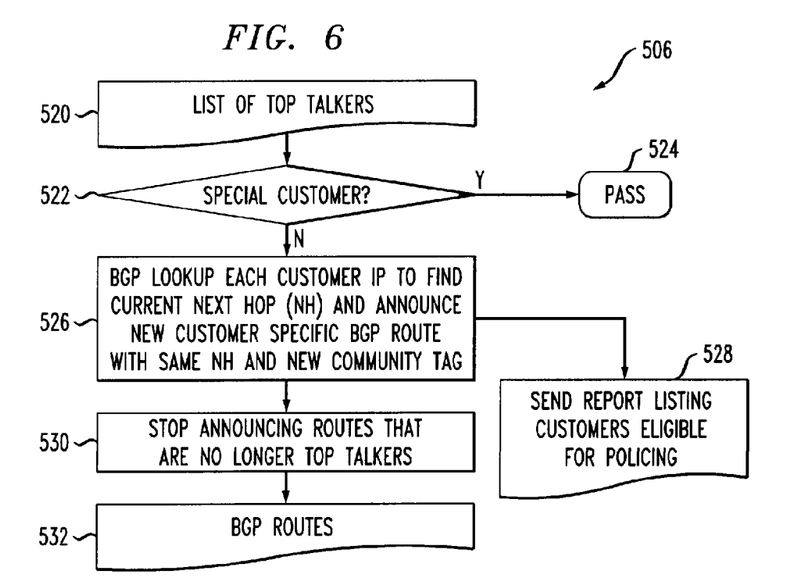
FIG. 6 shows an exemplary method which may be implemented by an analysis module such as the deep packet inspection module of FIG. 1.

Several steps or criteria may then be applied. In decision block 522, check whether the particular customer is a special customer (to whom policing should not apply); if so, as per the "Y" block, pass the traffic as shown at 524. If not, continue at 526.

In block 526, conduct a look-up of the customer's IP address, to find out what the "next hop" towards the customer is. The next hop towards a particular customer seeks to determine where the traffic to the customer will be directed next. In most cases, the next hop is the head end router 1091 in the head end 150 for the customer's division. It is possible to carry out the look-up to determine the next hop because the customer's IP address is known; the next hop is advertised by the head end router 1091 to the POP router 1008.

In one or more embodiments, re-introduce a route for traffic to get to its destination. The traffic takes the same route, but the route is reintroduced with a tag. Thus, look up the customer's IP address, obtain the customer's next hop, and then with that information, build a route to the customer, using the same next hop. The data thus takes the same path to get to the customer, but a community tag is appended to the data. A community tag is part of the BGP protocol (border gateway protocol), which is a protocol used by Internet Service Providers (ISPs) use to exchange routing information. Thus, in one or more embodiments, perform the lookup, build the route, as shown at 532, and in parallel to that, at 528, send a report listing the customers being considered for policing. It is advantageous to have a list of the customers who are being impacted. The report can be made available, for example, on a web site so the user can see if he or she is on the list by signing in to the web site; he or she will receive a definitive answer as to whether he or she is on the list. Note that reference to "he or she" is intended to encompass both individual customers and customers that are business or governmental entities, organizations, and the like. In one or more embodiments, in addition to or in lieu of the aforementioned web site, another web site can be provided for use by a CSR (customer service representative) who can look to see if a customer is impacted by the policing.

The process just described preferably runs on a periodic basis; by way of example and not limitation, say, once an hour. It is possible that a customer may fall out of the top user list. Accordingly, preferably before the BGP routes are announced back into the network in step 532, carry out step 530, wherein DPI module 1006 stops announcing routes that are no longer top users. If a customer is no longer a top user, remove their specific route from the list before sending the announcements out again in step 532. DPI module 506 can, given the teachings herein, be programmed to carry out the logic just described with regard to FIG. 6. In step 532, the BGP routes are sent down to the POP router 1008. The POP router 1008 now has a set of routes that identify the top users based on the community tag. POP router 1008 holds that information until there is another update from the DPI module 1006, whether it be an hour later as in the non-limiting example, or however often the logic in FIG. 6 is carried out.

Figure 5:
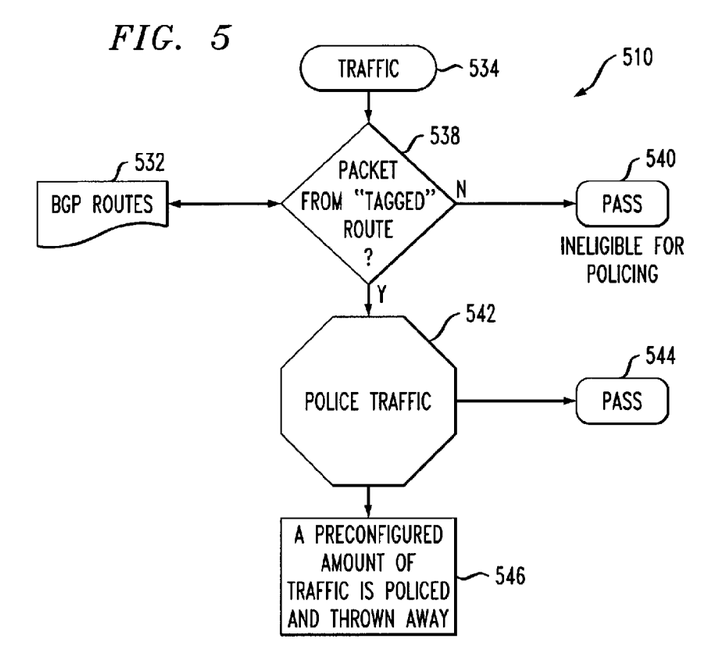
FIG. 5 shows an exemplary method which may be implemented by a router such as the POP router of FIG. 1.

In parallel to the process described with regard to FIG. 6, and with reference now to process 510 of FIG. 5, there is traffic 534 flowing through the router 1008 from the Internet 1002 to the customers (for example, on network 1046), essentially non-stop. The flow is shown in FIG. 5. Traffic 534 enters router 1008 and a test is performed in decision block 538 to determine whether a particular packet is destined for a customer who has been tagged (based on the BGP route in table 532). If the customer has not been tagged, as per the "N" branch of block 538, the packet is not eligible for policing and it is thus allowed to pass as shown at block 540.

Conversely, if the traffic does match one of the BGP routes, as per the "Y" branch of decision block 538, it is eligible for policing as shown at block 542. Some portion of the traffic eligible for policing is allowed to pass, as shown at block 544, while the remaining portion is discarded, as indicated at 546.

To determine how much traffic to discard at 546, determine by what percentage it is desired to reduce the overall Internet capacity consumption (for example, 5% or 10%). Operate the system 1000 for some time carrying out all the described steps, except the actual policing. Count traffic over the given period of time to determine how much of the traffic passing through the router 1008 was eligible for policing, and determine how much (for example, 50%) of the traffic eligible for policing would actually have to be discarded in step 546 to meet the desired reduction in overall Internet capacity consumption (as noted, for example, 5% or 10%). A more detailed description of this process is provided below.

Thus, one or more embodiments of the invention do not target any specific type of traffic and do not apply to all customers, but rather only to a subset of customers that are identified as "top users."

It is presently believed preferable that the percentage of policing-eligible traffic to be discarded not be user-specific, but rather be the same for all the top users. Otherwise, customers could access a "speed-server" site and see that their traffic was suppressed. In one or more embodiments, lump all the top users together, in effect. A customer who is in the top user list, depending on when he or she accesses the speed-server site, will see different throughputs. If none of the other top users are making use of the network at that particular instant, the particular customer might obtain the full speed he or she is allowed, and when accessing the speed server test site it will appear as if nothing is happening to the particular customer's traffic. At other times, that customer's throughput may be throttled back and the customer will note poor performance; however, the customer perceives random congestion in the network and not that he or she has been singled out as an abuser of the network.

Figure 7:
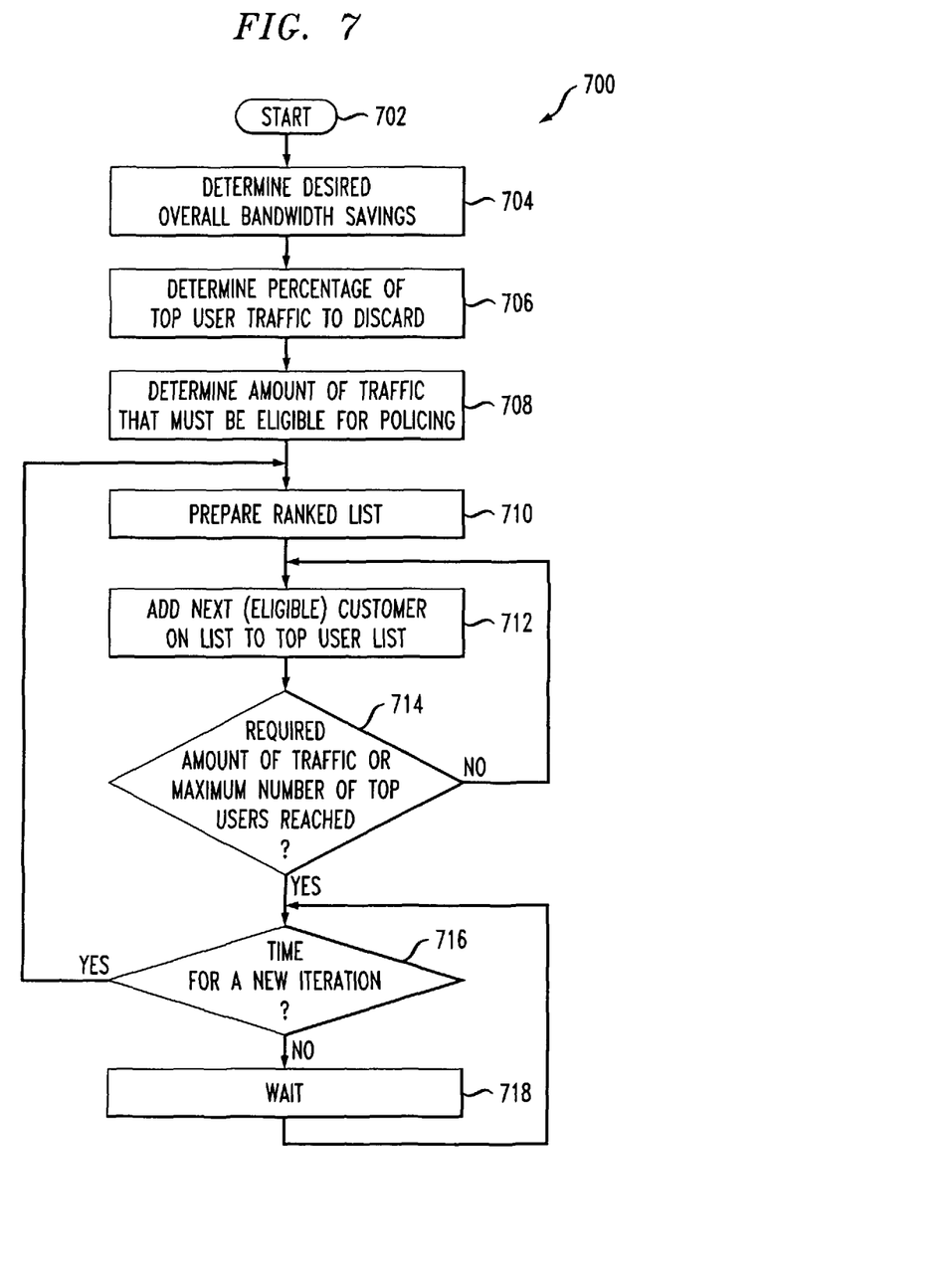
FIG. 7 is a flow chart of exemplary method steps according to a further aspect of the invention.

An example of how to identify the "top users" as in step 520 will now be provided, with reference to flow chart 700 of FIG. 7, which begins in step 702. Two numbers are preferably picked in advance: (i) desired overall savings for transit or Internet traffic (e.g., 5%), as at step 704; and (ii) once the top users have been identified, how much of their traffic is it appropriate to discard (e.g., 50%), as in step 706. The percentages are exemplary and non-limiting. The desired overall savings may be determined, in step 704, based on business considerations. The amount of traffic that it is appropriate to discard for the top users, in step 706, is based on a trade-off between (a) not discarding so much traffic for the top users that they become unable to effectively use the Internet, versus (b) the desire to limit the number of customers from the top of the ranked list (see below) who need to be placed on the top users list and thus have their traffic eligible for policing. For example, in some instances, if only ⅓ of the eligible traffic were to be discarded, the list of top users might have to grow considerably, since the majority of bandwidth is often used by only a very few customers.

Once the aforementioned two numbers have been selected, work backwards as follows in step 708. For example, if a region has 100 gigabits per second of transit traffic, and if it is desired to reduce this by 5% (5 gigabits per second), and only 50% of the top user traffic is to be discarded, then 10 gigabits per second must be eligible for policing (that is, be associated with top users). Examine consumption by individual customers for a predetermined time period (for example, the last hour), and, as in step 710, sort the customers by consumption from the highest to the lowest, regardless of the type of application for the particular customer's traffic, to obtain a ranked list. Select a sufficient number of customers from the top of the ranked list, to meet the required amount of traffic eligible for policing (here, 10 gigabits per second). These customers constitute the list of top users for that iteration of the process. This is illustrated at step 712 and in decision block 714. In step 712, the "next" customer is the first customer in the first execution of the step. As shown in decision block 716 and step 718, the process can be repeated (i.e., another iteration carried out) every predetermined time period (e.g., one hour). In the next iteration, a different number of customers may be selected from the top of the ranked list to meet the required amount of traffic eligible for policing (here, 10 gigabits per second). In at least some cases, it may be appropriate to run the system without policing, and determine the various percentages mentioned.

It should also be noted that the discussion with respect to FIG. 7 in the preceding paragraphs is based on peak usage. Top users might experience the maximum 50% packet drop during peak usage times, but during non-peak times, little or no packet drop might occur. In one or more embodiments, assign a fixed downstream pipe (say, 100 megabits per second) which is to be shared by the top users. During peak times, they may all be competing for this available pipe, while during non-peak times, the amount of traffic from the top users may be less than the assigned pipe, so that there is no competition.

In some instances, the number of potential top users may be limited. For example, in off-peak conditions, there may be many people all consuming a small amount of bandwidth, such that without limiting the number of top users, a large percentage of users might be policed. Therefore, in some cases, set a fixed maximum number of top users (say, 100) or limit the number of top users to a certain percentage of the overall customer base (say 10 or 20%). In this case, when traveling down the ranked list, stop when the list of top users reaches a sufficient number to achieve the required amount of traffic eligible for policing (here, 10 gigabits per second) or stop when the list of top users reaches the fixed maximum number or allowable percentage, whichever comes first. This is depicted in decision block 714.

In some instances, router 1008 is configured to allow through a target number based on peak conditions; for example, allow 50% of the 10 gigabits per second=5 gigabits per second through. In less than peak circumstances, the top users might only be using 8 gigabits per second, while the router 1008 is still configured to pass 5 gigabits per second of policing-eligible traffic, such that only 3 gigabits per second of policing-eligible traffic would be discarded in such case. The logic of block 542 in FIG. 5 is typically hard coded on router 1008 such that it will pass (in the non-limiting example) 5 gigabits per second from tagged routes.

In some other instances, policing could be turned off in off-peak hours by simply not tagging any routes.

One or more embodiments of the invention thus provide a destination based method for managing network resources. Network resource utilization can be categorized by destination, end user, and protocol types. Based on these classifications, resource policies ensuring fair use of specific network capacities can be applied, thereby providing a distribution of resources in a relatively uniform matter. One or more embodiments of the invention are based on who is consuming data. The packet destination is identified by the DPI module 1006 and signaled back to the POP router 1008. BGP signaling is used to tag the "top users."

One or more embodiments of the invention may be useful, for example, in managing widely disparate traffic distributions across internet networks where it is desirable to maintain a more uniform consumption of available resources across the network consumers of those resources (for example, large subscriber based network infrastructures). One or more embodiments of the invention advantageously achieve a normalization of traffic utilization in networks where some consumers of network resources disproportionately consume those resources to the detriment of other consumers.

Given the description thus far, it will be appreciated that, in general terms, a method, according to an aspect of the invention, includes the step (for example, step 520) of identifying, in a set of customers of a packet communications network, a top usage subset. The packet communications network could be, for example, network 1046. The top usage subset includes those of the customers who are using more bandwidth of the packet communications network than other ones of the customers. The top usage subset includes at least two customers. An additional step (for example, step 526) includes identifying, at an entry point (e.g., tap 1004, DPI 1006, and router 1008) of the communications network, routes of packets destined for the top usage subset. A further step (e.g., step 542) includes discarding a predetermined percentage of the packets destined for the top usage subset, based on the identified routes. The predetermined percentage is determined in order to reduce bandwidth utilization of the packet communications network by a desired amount. The predetermined percentage is identical for all of the customers in the top usage subset.

In some instances, for example, as shown at decision block 522, an additional step includes refraining from discarding any of the packets destined for special customers not eligible for traffic policing; e.g., customers who have a commercial internet protocol address, customers who have subscribed to a premium service, and the like. Commercial customers might also be identified, for example, by checking an external LDAP (lightweight directory access protocol) billing database or the like to determine that they were commercial customers (instead of making this determination based upon IP address). The ranked list could be constructed and special customers could be discarded from same; or the special customers could be ineligible for consideration for the ranked list.

In some instances, the step of identifying of the top usage subset includes ranking all of the customers of the packet communications network from highest usage to lowest usage, based on usage of the packet communications network for a predetermined time period, so as to obtain a ranked list. The step of identifying the top usage subset, in such cases, also includes picking at least two of the customers from the top of the ranked list to obtain the top usage subset. The picking can be carried out by adding customers from the top of the ranked list until a sufficient number of members are present in the top usage subset to obtain the desired amount of reduction in bandwidth utilization, as described with regard to FIG. 7.

In some cases, an additional step includes checking whether a predetermined maximum number of members are in the top usage subset, and, responsive to the checking indicating that the predetermined maximum number of members are in the top usage subset, refraining from adding additional members to the top usage subset even if a sufficient number of members to obtain the desired amount of reduction in bandwidth utilization are not present in the top usage subset. See decision block 714.

In one or more instances, an additional step includes refraining from the discarding step during off peak times for the packet communications network (that is, stop policing when utilization is low).

In one or more embodiments, an additional step includes preparing a report listing the customers in the top usage subset, as per 528.

In one or more embodiments, identifying the routes of the packets destined for the top usage subset includes identifying a next hop for those of the packets destined for the top usage subset, and, based on the next hops, determining the routes of the packets destined for the top usage subset (for example, by tagging them as tagged customer-specific routes having identical next hops). In at least some instances, the routes are border gateway protocol (BGP) routes.

In one or more embodiments, the step of discarding the predetermined percentage of the packets destined for the top usage subset includes examining, at the entry point of the communications network, all incoming packets (for example, in decision block 538). In the case that one of the incoming packets is not from one of the identified routes, it is passed, as in block 540. In the case that one of the incoming packets is from one of the identified routes, it is selectively discarded in block 542, as shown at block 546, to meet the predetermined percentage. That is, "selectively discarding," as used herein, including the claims, means that the packet, eligible for policing, is discarded if within the percentage to be discarded (for example, all packets not eligible for policing are passed, while for those eligible for policing, a certain percentage are discarded—in a simple example, if that percentage was 10%, "selective discarding" could be achieved by discarding every $10^{th}$ packet eligible for policing). In another example, if the percentage to be discarded was 50%, "selectively discarding" could be achieved by discarding every other packet eligible for policing. As noted elsewhere, in some instances, a predetermined volume of bits per second associated with tagged routes is allowed and anything exceeding that is discarded.

Preferably, the list of top users (top usage subset) is updated periodically, and any of the tagged customer-specific routes no longer associated with the top usage subset are removed (routes no longer announced) as in step 530.

Furthermore, in general terms, a system for policing traffic from a first packet-based network to a second packet-based network, according to an aspect of the invention, includes a replicator configured to be coupled to the first packet-based network. Such a replicator could include, for example, a tap such as passive tap 1004. In an alternative embodiment, the replicator could include a mirror. A tap physically splits the traffic, while in a mirror approach, the router or switch supporting the DPI module 1006 could mirror the traffic internally to the DPI module. Internet 1002 is a non-limiting example of the first packet-based network. Network 1046 is a non-limiting example of the second packet-based network. The system also includes a packet analysis module coupled to the replicator. A DPI module 1006 is a non-limiting example of such a packet analysis module. The system further includes a router coupled to the replicator and the packet analysis module, and configured to be coupled to the second packet-based network. POP router 1008 is a non-limiting example of such a router.

The replicator receives packets from the first packet-based network, passes the packets to the router, and passes a copy of the packets to the packet analysis module (as used herein, including the claims, the "copy" terminology is intended to cover both the tapping and mirroring processes). The packet analysis module identifies, within the set of customers of the second packet-based network, a top usage subset (e.g., the above-mentioned "top users"). The top usage subset includes (at least two of) those customers who are using more bandwidth of the second packet-based network than other customers.

The packet analysis module identifies, at an entry point of the second packet-based network (e.g., tap 1004), routes of packets destined for the top usage subset.

The router discards a predetermined percentage of the packets destined for the top usage subset, based on the routes identified by the packet analysis module. As discussed above, the predetermined percentage is determined in order to reduce bandwidth utilization of the second packet-based network by a desired amount, and the predetermined percentage is identical for all of the customers in the top usage subset.

In a preferred but non-limiting embodiment, the packet analysis module and the router are cooperatively configured to refrain from discarding any packets destined for special customers not eligible for traffic policing. For example, DPI 1006 does not include the same in the tagged routes, and so they are passed without policing by the router as in step 540.

The packet analysis module can carry out any one or more of the steps described with respect to FIG. 6. The router can carry out any one or more of the steps described with respect to FIG. 5.

System and Article of Manufacture Details

The invention can employ hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a tangible computer-readable recordable storage medium (or multiple such media). Appropriate interconnections via bus, network, and the like can also be included.

Figure 8:
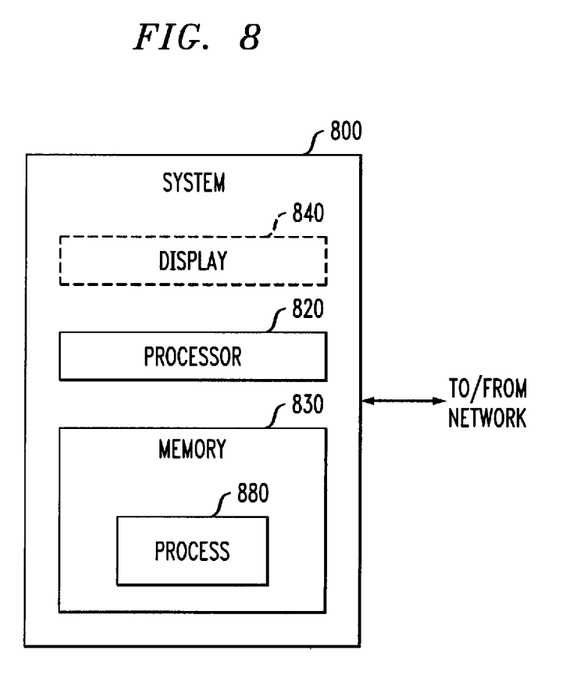
FIG. 8 is a block diagram of a computer system useful in connection with one or more aspects of the invention.

FIG. 8 is a block diagram of a system 800. As shown in FIG. 8, memory 830 configures the processor 820 to implement one or more methods, steps, and functions (collectively, shown as process 880 in FIG. 8). The memory 830 could be distributed or local and the processor 820 could be distributed or singular. Different steps could be carried out by different processors. In one or more preferred embodiments, rather than a general purpose computer, some steps are carried out by a processor or processors of a router 1008 and some steps are carried out by a processor or processors of a packet analysis module 1006.

The memory 830 could be implemented as an electrical, magnetic or optical memory, or any combination of these or other types of storage devices. It should be noted that if distributed processors are employed, each distributed processor that makes up processor 820 generally contains its own addressable memory space. It should also be noted that some or all of computer system 800 can be incorporated into an application-specific or general-use integrated circuit. For example, one or more method steps could be implemented in hardware in an ASIC rather than using firmware. Display 840 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, processing capability on router 1008 and/or DPI module 1006), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is intended to encompass a recordable medium, examples of which are set forth above, but is not intended to encompass a transmission medium or disembodied signal.

The elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, for example, on router 1008 or DPI module 1006, and that such program may be embodied on a tangible computer readable recordable storage medium.

As used herein, including the claims, a "server" includes a physical data processing system (for example, system 800 as shown in FIG. 8) running a server program. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. router module with instructions for router 1008 and packet analysis module). The method steps can then be carried out using the distinct software modules of the system, as described above, executing on the one or more hardware processors (e.g., a processor or processors in the router and a processor or processors in the packet analysis module). Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
   identifying, in a set of customers of a packet communications network, a top usage subset, said top usage subset comprising those of said customers who are using more bandwidth of said packet communications network than other ones of said customers, said top usage subset including at least two of said customers;
   identifying, at an entry point of said communications network, routes of packets destined for said top usage subset, said routes comprising border gateway protocol routes, by:
      identifying a next hop for those of said packets destined for said top usage subset;
      based on said next hops, determining said routes of said packets destined for said top usage subset; and
      tagging said routes of said packets destined for said top usage subset with border gateway protocol community tags as tagged customer-specific routes with identical next hops; and
   discarding a predetermined percentage of said packets destined for said top usage subset, based on said border gateway protocol community tags, said predetermined percentage being determined in order to reduce bandwidth utilization of said packet communications network by a desired amount, said predetermined percentage being identical for all of said customers in said top usage subset.

2. The method of claim 1, further comprising refraining from discarding any of those of said packets destined for special customers not eligible for traffic policing.

3. The method of claim 2, wherein said special customers comprise premium customers who have paid an additional fee for a higher level of service.

4. The method of claim 2, wherein said special customers comprise commercial customers identified by internet protocol address.

5. The method of claim 2, wherein said special customers comprise commercial customers identified by reference to a billing database.

6. The method of claim 1, wherein said identifying of said top usage subset comprises:
   ranking all of said customers of said packet communications network from highest usage to lowest usage, based on usage of said packet communications network for a predetermined time period, to obtain a ranked list having a top and a bottom; and
   picking at least two of said customers from said top of said ranked list to obtain said top usage subset, said picking being carried out by adding said customers from said top of said ranked list until a sufficient number of members are present in said top usage subset to obtain said desired amount of reduction in bandwidth utilization.

7. The method of claim 6, further comprising checking whether a predetermined maximum number of members are in said top usage subset, and, responsive to said checking indicating that said predetermined maximum number of members are in said top usage subset, refraining from adding additional members to said top usage subset even if a sufficient number of members to obtain said desired amount of reduction in bandwidth utilization are not present in said top usage subset.

8. The method of claim 6, further comprising refraining from said discarding step during off peak times for said packet communications network 9. The method of claim 1, further comprising preparing a report listing said customers in said top usage subset.

10. The method of claim 1, wherein said step of discarding said predetermined percentage of said packets destined for said top usage subset comprises:
   examining, at said entry point of said communications network, all incoming packets;
   in a case that a first given one of said incoming packets is not from one of said tagged routes, passing said first given one of said incoming packets; and
   in a case that a second given one of said incoming packets is from one of said tagged routes, selectively discarding said second given one of said incoming packets to meet said predetermined percentage.

11. The method of claim 1, wherein:
   said identifying of said top usage subset comprises:
      ranking all of said customers of said packet communications network from highest usage to lowest usage, based on usage of said packet communications network for a predetermined time period, to obtain a ranked list having a top and a bottom; and
      picking at least two of said customers from said top of said ranked list to obtain said top usage subset, said picking being carried out by adding said customers from said top of said ranked list until a sufficient number of members are present in said top usage subset to obtain said desired amount of reduction in bandwidth utilization; and
   said step of discarding said predetermined percentage of said packets destined for said top usage subset comprises:
      examining, at said entry point of said communications network, all incoming packets;
      in a case that a first given one of said incoming packets is not from one of said tagged routes, passing said first given one of said incoming packets; and
      in a case that a second given one of said incoming packets is from one of said tagged routes, selectively discarding said second given one of said incoming packets to meet said predetermined percentage;
   further comprising periodically;
      re-determining said top usage subset; and
      removing from said identified routes any of said identified routes no longer associated with said top usage subset.

12. The method of claim 1, further comprising providing a system, wherein the system comprises distinct software modules, each of the distinct software modules being embodied on a tangible computer-readable recordable storage medium, and wherein the distinct software modules comprise a packet analysis module and a routing module;
   wherein:
   said step of identifying, in said set of customers of said packet communications network, said top usage subset, is carried out by said packet analysis module implemented on a deep packet inspection box;
   said step of identifying, at said entry point of said communications network, said routes of said packets destined for said top usage subset, is carried out by said packet analysis module implemented on said deep packet inspection box; and
   said step of discarding said predetermined percentage of said packets destined for said top usage subset is carried out by said router module implemented on a router.

13. An apparatus comprising:
   means for identifying, in a set of customers of a packet communications network, a top usage subset, said top usage subset comprising those of said customers who are using more bandwidth of said packet communications network than other ones of said customers, said top usage subset including at least two of said customers;
   means for identifying, at an entry point of said communications network, routes of packets destined for said top usage subset, said routes comprising border gateway protocol routes, by:
      identifying a next hop for those of said packets destined for said top usage subset;
      based on said next hops, determining said routes of said packets destined for said top usage subset; and
      tagging said routes of said packets destined for said top usage subset with border gateway protocol community tags as tagged customer-specific routes with identical next hops; and
   means for discarding a predetermined percentage of said packets destined for said top usage subset, based on said border gateway protocol community tags, said predetermined percentage being determined in order to reduce bandwidth utilization of said packet communications network by a desired amount, said predetermined percentage being identical for all of said customers in said top usage subset.

14. An article of manufacture comprising a computer program product, said computer program product in turn comprising a non-transitory tangible computer readable recordable storage medium, storing in a non-transitory mariner computer readable program code, the computer program product including:

computer usable program code configured to identify, in a set of customers of a packet communications network, a top usage subset, said top usage subset comprising those of said customers who are using more bandwidth of said packet communications network than other ones of said customers, said top usage subset including at least two of said customers;

computer usable program code configured to identify, at an entry point of said communications network, routes of packets destined for said top usage subset, said routes comprising border gateway protocol routes, by:
    identifying a next hop for those of said packets destined for said top usage subset;
    based on said next hops, determining said routes of said packets destined for said top usage subset; and
    tagging said routes of said packets destined for said top usage subset with border gateway protocol community tags as tagged customer-specific routes with identical next hops; and computer usable program code configured to discard a predetermined percentage of said packets destined for said top usage subset, based on said border gateway protocol community tags, said predetermined percentage being determined in order to reduce bandwidth utilization of said packet communications network by a desired amount, said predetermined percentage being identical for all of said customers in said top usage subset.

15. The article of manufacture of claim 14, further comprising distinct software modules, each of the distinct software modules being embodied on said tangible computer-readable recordable storage medium, said distinct software modules comprising a packet analysis module and a routing module;
  wherein:
    said packet analysis module comprises:
      said computer usable program code configured to identify, in said set of customers of a packet communications network, said top usage subset; and
      said computer usable program code configured to identify, at said entry point of said communications network, said routes of said packets destined for said top usage subset; and
    said routing module comprises said computer usable program code configured to discard said predetermined percentage of said packets.

16. A system for policing traffic from a first packet-based network to a second packet-based network, said system comprising:
  a replicator configured to be coupled to the first packet-based network;
  a packet analysis module coupled to said replicator; and
  a router coupled to said replicator and said packet analysis module, and configured to be coupled to the second packet-based network;
  wherein:
  said replicator receives packets from the first packet-based network, passes said packets to said router, and passes a copy of said packets to said packet analysis module;
  said packet analysis module identifies, in a set of customers of the second packet-based network, a top usage subset, said top usage subset comprising those of said customers who are using more bandwidth of the second packet-based network than other ones of said customers, said top usage subset including at least two of said customers;
  said packet analysis module identifies, at an entry point of the second packet-based network, routes of packets destined for said top usage subset, said routes comprising border gateway protocol routes, by:
    identifying a next hop for those of said packets destined for said top usage subset;
    based on said next hops, determining said routes of said packets destined for said top usage subset; and
    tagging said routes of said packets destined for said top usage subset with border gateway protocol community tags as tagged customer-specific routes with identical next hops; and
  said router discards a predetermined percentage of said packets destined for said top usage subset, based on said border gateway protocol community tags, said predetermined percentage being determined in order to reduce bandwidth utilization of the second packet-based network by a desired amount, said predetermined percentage being identical for all of said customers in said top usage subset.

17. The system of claim 16, wherein said packet analysis module and said router are cooperatively configured to refrain from discarding any of those of said packets destined for special customers not eligible for traffic policing.

18. The system of claim 16, wherein said packet analysis module identifies said top usage subset by:
  ranking all of said customers of the second packet-based network from highest usage to lowest usage, based on usage of the second packet-based network for a predetermined time period, to obtain a ranked list having a top and a bottom; and
  picking at least two of said customers from said top of said ranked list to obtain said top usage subset, said picking being carried out by adding said customers from said top of said ranked list until a sufficient number of members are present in said top usage subset to obtain said desired amount of reduction in bandwidth utilization.

19. The system of claim 16, wherein said packet analysis module prepares a report listing said customers in said top usage subset.

20. The system of claim 16, wherein said router discards said predetermined percentage of said packets destined for said top usage subset by:
  examining, at said entry point of the second packet-based network, all incoming packets;
  in a case that a first given one of said incoming packets is not from one of said identified routes, passing said first given one of said incoming packets; and
  in a case that a second given one of said incoming packets is from one of said identified routes, selectively discarding said second given one of said incoming packets to meet said predetermined percentage.

21. The system of claim 16, wherein:
said packet analysis module identifies said top usage subset by:
  ranking all of said customers of the second packet-based network from highest usage to lowest usage, based on usage of the second packet-based network for a predetermined time period, to obtain a ranked list having a top and a bottom; and
  picking at least two of said customers from said top of said ranked list to obtain said top usage subset, said picking being carried out by adding said customers from said top of said ranked list until a sufficient number of members are present in said top usage subset to obtain said desired amount of reduction in bandwidth utilization; and said router discards said predetermined percentage of said packets destined for said top usage subset by:
- examining, at said entry point of the second packet-based network, all incoming packets;
- in a case that a first given one of said incoming packets is not from one of said tagged routes, passing said first given one of said incoming packets; and
- in a case that a second given one of said incoming packets is from one of said tagged routes, selectively discarding said second given one of said incoming packets to meet said predetermined percentage;

said packet analysis module periodically re-determines said top usage subset; and said packet analysis module periodically removes from said identified routes any of said identified routes no longer associated with said top usage subset.

\* \* \* \* \*